June 28, 1960 G. J. SEGAL 2,942,290
SELF-LOCKING CASTER
Filed May 14, 1957
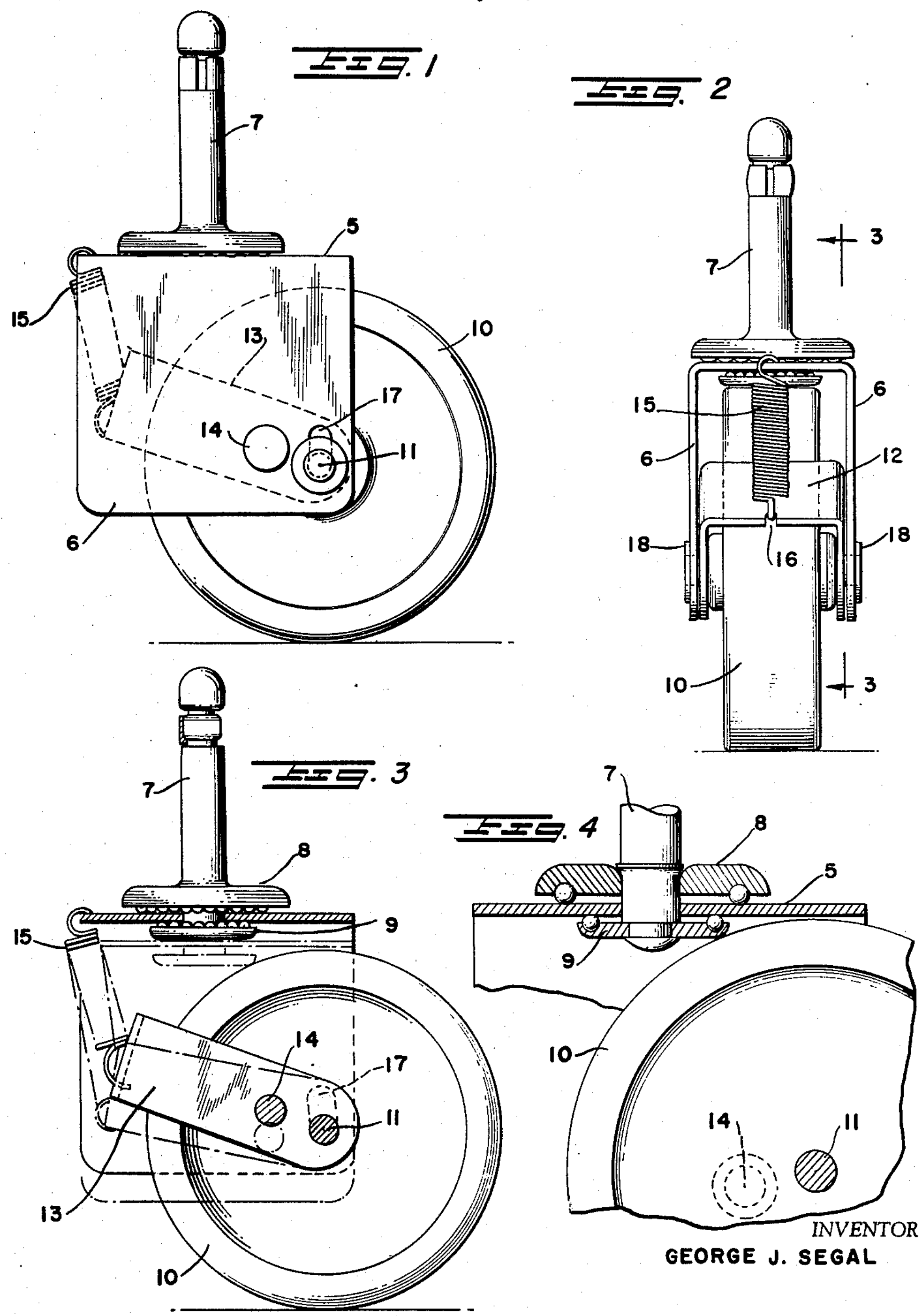
INVENTOR
GEORGE J. SEGAL
BY Aaron R. Townshend
ATTORNEY United States Patent Office 2,942,290

Patented June 28, 1960

2,942,290

SELF-LOCKING CASTER

George J. Segal, 400 S. 15th St., Philadelphia, Pa.

Filed May 14, 1957, Ser. No. 659,102

6 Claims. (Cl. 16—35)

This invention relates to furniture casters of the ball bearing pintle type. In conventional casters of this type the horn is free to swivel on the pintle and the wheel is free to rotate between the legs of the horn at all times and under any condition of load, regardless of its weight. Such easy turning and rolling gives a high degree of mobility to any piece of furniture that is equipped with the casters. Easy mobility of furniture, especially of large and cumbersome pieces, is most desirable for floor cleaning purposes and shifting movement in general. However, in the case of beds, upholstered sofas, chairs, and other pieces of furniture upon which people sit or recline, unrestrained mobility when occupied is highly objectionable. For that reason such pieces usually are not mounted on casters.

An object of the present invention is to provide a caster that swivels and rolls freely at all times under the static or dead weight load of an article of furniture to which it is attached, but which is automatically self-locking when subjected to a live load in excess of a predetermined amount; so that it can neither swivel nor roll until the live load is removed.

Another object is to provide, in such a caster, an arrangement in which the dual locking is accomplished by frictional engagement between the caster wheel and an element of the ball bearing mounting of the pintle in the horn.

Other and incidental objects will be apparent from the following description taken in conjunction with the accompanying drawing, in which:

Fig. 1 is a side elevation of the caster prior to locking;

Fig. 2 is an end view thereof from the left of Fig. 1;

Fig. 3 is a sectional view taken on the line 3—3 of Fig. 2, and illustrating in chain and dotted lines the positions assumed by the various parts when the caster is locked;

Fig. 4 is an enlarged fragmentary elevation, partly in section, illustrating the locked relationship of the parts.

As shown, the caster includes a horn having a flat top 5 and a pair of laterally spaced parallel legs 6 perpendicular thereto. The legs are substantially rectangular and are integral with the top. A pintle 7 is mounted for free rotation in the horn top by conventional antifriction ball bearing assembly having its upper race 8 above the horn top and its lower race 9 immediately beneath the top, both being rigidly fixed to the pintle for rotation therewith. The caster further includes a conventional wheel 10 rotatable freely between the legs of the horn on an axle 11 which has a floating mounting relative to the horn. In the embodiment of the invention herein shown and described the floating mounting comprises a yoke lever 12 that straddles the wheel between the legs of the horn with its parallel arms 13 pivoted intermediate their ends on bearing studs 14 carried by the horn legs 6.

The yoke pivot studs 14 are on a common axis perpendicular to the horn legs, which axis is located in the lower end portions of the horn legs and, with reference to Fig. 1, at a point substantially midway between a prolongation of the pintle axis and the vertical edge of the horn legs adjacent the axle of the wheel. Thus the open end of the yoke is offset with respect to the pintle. The closed end of the yoke lies beneath the pintle mount assembly and is connected with the adjacent end of the horn top 5 by a retraction coil spring 15 that is in hooked engagement at its upper end with the adjacent edge portion of the horn top and at its lower end in an anchoring notch 16 in the bottom edge of the closed end of the yoke. The free end portions of the yoke arms 13 beyond the pivot studs 14 are appropriately apertured to receive therethrough in pivotal bearing relation the ends of the wheel axle 11, which ends project through substantially vertical clearance slots 17 provided in the legs of the horn. These slots 17 are closed at each end and are of sufficient length to allow the horn to descend to full lock position, as shown in Figs. 3 and 4, without engagement of the upper ends of the slots against the wheel axle ends. The axle ends do not at any time contact the upper ends of the slots. Retainer washers 18 attached to the outer ends of the wheel axle are slidable freely over the outer faces of the horn legs.

The spring 15 is applied under tension and it remains under tension at all times. Under a condition of no load on the caster the upward pull of the spring on the closed end of the yoke 12 is sufficient to rock the yoke on its pivots 14 and hold it in the limit position shown in Fig. 1. In this limit position the yoke is inclined in the horn with the ends of the wheel axle seated on the bottom of the horn slots 17 and with the rim of the wheel disposed below and out of engagement with the ball race 9. When the caster is attached to a article of furniture and is in use the strength of the spring 15 determines the load weight at which the caster will lock. The caster is designed to take the static or dead weight load of the article of furniture, with some marginal addition, without locking.

By way of example: The present caster is designed for use in sets of four, one for each leg of a Hollywood type bed. The bed frame, spring, mattress, and other things which make up a complete bed assembly ready for use weigh approximately 115 pounds. The combined strength of the four springs is such that between them they will sustain this weight with a margin of approximately 50 pounds extra weight in addition and will maintain a normal clearance of approximately one-eighth of an inch between the lower ball race and the wheel rim before they give under the weight and allow the casters to lock. When a live load in excess of the calculated margin is applied, such as when a person weighing more than the calculated margin enters upon the bed, the springs are overcome. Thereupon the horn drops down until the lower race 9 engages and seats on the rim of the wheel, so that the full weight of the load is then carried by the top of the horn and the rim of the wheel. Under this condition each caster is doubly locked. The wheel cannot rotate and the horn cannot turn on the pintle because the race 9 is rigidly fixed thereto.

In the caster of the present invention locking is accomplished as a result of relative movement of the top of the horn and the top of the wheel toward each other, which occurs whenever the weight of the load on the horn is sufficient to overcome the spring. When the spring is overcome the horn descends. In the absence of a weight on the horn greater than the predetermined extra margin the pull of the spring holds the top of the wheel and the top of the horn apart a distance sufficient to maintain the ball race 9 out of contact against the rim of the wheel.

It is within the purview of the present invention that the swivel connection between the pintle and the horn may be other than antifriction. The ball bearings may be eliminated. The essential requirement is that some element of the pintle mounting that is rigidly fixed to or which is a part of the pintle stem be capable of seating down against the wheel rim for locking. It is also within the purview of the invention that the slots 17 may be dispensed with, in which case the ends of the wheel axle will abut directly against the adjacent edges of the horn legs which then will lie between the pivot studs 14 and the axle ends. In either case, with or without the slots, the ends of the wheel axle abut against a portion of the horn legs between the pivot studs 14 and the axle ends, under the urge of the spring until it is overcome.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claims.

I claim:

1. A self-locking caster comprising, a horn having depending parallel legs, a caster wheel having a floating mounting therein, a pintle in swivel connection with the horn above the top of the wheel, a friction lock element fixed on the pintle for engagement against the wheel rim when the top of the horn is moved toward the top of the wheel, and a spring connected between an element of the wheel mounting and the top of the horn, said spring operatively holding the wheel in a position in which its rim is out of engagement with said friction lock element until the application of a load on the horn top sufficient to overcome the spring and thereby force the wheel rim and the lock element into frictional engagement against each other.

2. In the structure of claim 1, said floating mounting of the wheel including a lever pivoted intermediate its ends on the legs of the horn for oscillation therebetween, said lever at one end rotatably mounting the caster wheel, and the spring connecting the other end of the lever and the top of the horn.

3. In the structure of claim 1, the swivel connection including a ball bearing race beneath the horn top above the wheel and constituting said friction lock element.

4. In the structure of claim 2, the caster wheel having an axle, and the ends of the axle abutting an adjacent portion of each horn leg between the lever pivot and the axle under urge of the spring in the absence of a load on the top of the horn sufficient to overcome the spring.

5. In the structure of claim 1, said floating mounting of the wheel including a lever pivoted intermediate its ends on the legs of the horn for oscillation therebetween, the lever at one end rotatably mounting the caster wheel, the spring connecting one other end of the lever and the top of the horn, and said swivel connection including a ball bearing race beneath the horn top above the wheel and constituting the friction lock element.

6. In the structure of claim 5, the caster wheel having an axle, and the ends of the axle abutting an adjacent portion of each horn leg between the lever pivot and the axle under urge of the spring in the absence of a load on the top of the horn sufficient to overcome the spring.

References Cited in the file of this patent

UNITED STATES PATENTS

| | | |
|---|---|---|
| 523,801 | Vegiard | July 31, 1894 |
| 1,522,299 | Hampton | Jan. 6, 1925 |
| 1,630,514 | Bayer | May 31, 1927 |
| 1,778,167 | Roe | Oct. 14, 1930 |
| 1,895,150 | Darnell | Jan. 24, 1933 |
| 2,707,795 | Skupas | May 10, 1955 |

FOREIGN PATENTS

| | | |
|---|---|---|
| 17,403 | Great Britain | June 16, 1903 |